(12) United States Patent
Erickson et al.

(10) Patent No.: US 7,914,254 B2
(45) Date of Patent: Mar. 29, 2011

(54) INTEGRATED SUPPORT/THERMOCOUPLE HOUSING FOR IMPINGEMENT COOLING MANIFOLDS AND COOLING METHOD

(75) Inventors: Dean Matthew Erickson, Simpsonville, SC (US); Mitch Mircea Orza, Roswell, GA (US); Jason Seale, Simpsonville, SC (US); Hua Zhang, Greer, SC (US); Gregory Allan Crum, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 1080 days.

(21) Appl. No.: 11/705,496

(22) Filed: Feb. 13, 2007

(65) Prior Publication Data
US 2008/0193278 A1      Aug. 14, 2008

(51) Int. Cl.
*F01D 25/12* (2006.01)
(52) U.S. Cl. .......................... 415/118; 415/176; 415/220

(58) Field of Classification Search .................. 415/118, 415/176, 220, 1
See application file for complete search history.

(56) References Cited

U.S. PATENT DOCUMENTS

| | | | |
|---|---|---|---|
| 2,650,753 A * | 9/1953 | Howard et al. | ............... 415/137 |
| 4,573,806 A | 3/1986 | Moore et al. | |
| 5,685,158 A * | 11/1997 | Lenahan et al. | ................ 60/726 |
| RE35,674 E | 12/1997 | Pustell | |
| 6,431,824 B2 | 8/2002 | Schotsch et al. | |
| 6,546,735 B1 * | 4/2003 | Moniz et al. | .................... 60/773 |
| 6,872,047 B2 * | 3/2005 | Tanioka | ........................ 415/114 |

* cited by examiner

*Primary Examiner* — Ninh H Nguyen
(74) *Attorney, Agent, or Firm* — Nixon & Vanderhye PC

(57) ABSTRACT

A impingement cooling system for heavy duty turbines that includes a manifold affixed to a casing of the heavy-duty turbine, wherein the manifold includes a plurality of impingement holes in the surface of the manifold and a blower that provides air flow across the plurality of impingement holes of the manifold to cool the casing of the heavy-duty turbine to control the clearance between a tip of a turbine blade and a shroud of the heavy-duty turbine.

20 Claims, 6 Drawing Sheets

INTEGRATED SUPPORT/THERMOCOUPLE HOUSING FOR IMPINGEMENT COOLING MANIFOLDS AND COOLING METHOD

BACKGROUND OF THE INVENTION

Air impingement cooling has been used to manage the casing temperature of small gas turbines and to reduce and maintain the clearances between rotating blades and accompanying interior casing surfaces. One problem for air impingement cooling systems on heavy-duty gas turbines is the ability to achieve a uniform heat transfer coefficient across large non-uniform non-standard casing surfaces. On small gas turbines, small impingement holes and short nozzle to surface distances are normally applied. These factors produce the required higher heat transfer coefficients on the casing. One detrimental impact of applying small of impingement cooling holes is the need for operating with high differential pressure drop across the holes. This results in the requirement for undesirable high cooling air supply pressures which negatively impacts net efficiency.

Impingement cooling has been applied to aircraft engines as a method of turbine clearance control. However, the impingement systems used on aircraft engines cannot be used in heavy-duty turbine applications. The systems applied to aircraft engines utilize air extracted from the compressor as the cooling medium. It is not feasible to use compressor extraction air on heavy-duty gas turbines because the design heat transfer coefficients require cooler air temperatures. Heavy-duty gas turbines have a significantly larger, non-uniform casing surface that requires an intricate manifold design as compared to aircraft engines. Also, the casing thickness and casing thickness variations are considerably greater on heavy-duty gas turbines.

An impingement cooling system has been recently developed that can provide clearance control on heavy-duty gas turbines. This system properly delivers the required heat transfer coefficient to the targeted casing surface, and properly controls the flow of air to the casing.

BRIEF DESCRIPTION OF THE INVENTION

This invention relates to mounting details and methods of the impingement cooling manifolds of the above-mentioned recently developed impingement cooling system. More specifically, the invention provides manifold mounts that both support the manifolds off the turbine casing and function as wells for multiple embedded casing thermocouples.

Thus, the invention may be embodied an impingement cooling system for heavy duty turbines comprising: a impingement cooling manifold affixed to a casing of the heavy-duty turbine, wherein the impingement cooling manifold comprises a plurality of impingement holes in the surface of the impingement cooling manifold; a blower that provides air flow across the plurality of impingement holes of the impingement cooling manifold to cool the casing of the heavy-duty turbine to control a clearance between a tip of a turbine blade and a shroud of the heavy-duty turbine; and at least one support for supporting the impingement cooling manifold spaced from said casing, said support having a bore defined therethrough for receiving a casing thermocouple.

The invention may also be embodied in a method of cooling a heavy duty turbine casing comprising: affixing at least one impingement cooling manifold comprising a plurality of impingement holes to the casing with at least one support for supporting the impingement cooling manifold spaced from said casing, said support having a bore defined therethrough for receiving a casing thermocouple; and blowing air into the manifold and through the impingement holes to cool the casing and to control a clearance between at least one blade tip and at least one shroud located within the casing.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

The present invention now will be described more fully hereinafter with reference to the accompanying drawings, in which example embodiments of the invention are shown. This invention may, however, be embodied in many different forms and should not be construed as being limited to the embodiments set forth herein; rather, these embodiments are provided so that this disclosure will be thorough and complete, and will convey the scope of the invention to those skilled in the art.

Figure 1:
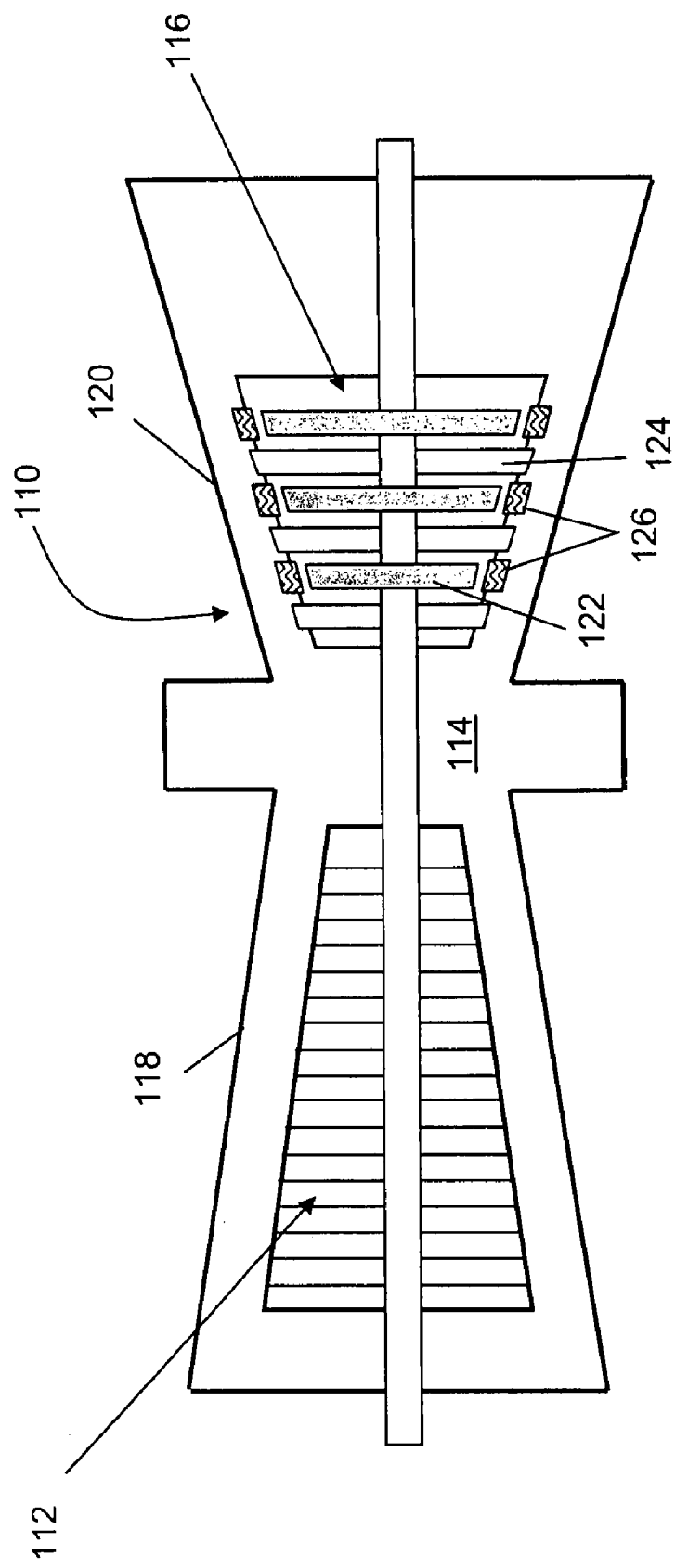
FIG. 1 is a cross-sectional view of a heavy duty gas turbine according to an example embodiment of the invention.

FIG. 1 illustrates an example embodiment of a heavy-duty turbine 110. The heavy-duty turbine engine includes a compressor section 112, combustor section 114, and a turbine section 116. The turbine 110 also includes a compressor casing 118 and a turbine casing 120. The turbine and compressor casings 118, 120 enclose major parts of the heavy-duty turbine. The turbine section 116 includes a shaft and a plurality of sets of rotating and stationary turbine blades.

Figure 2:
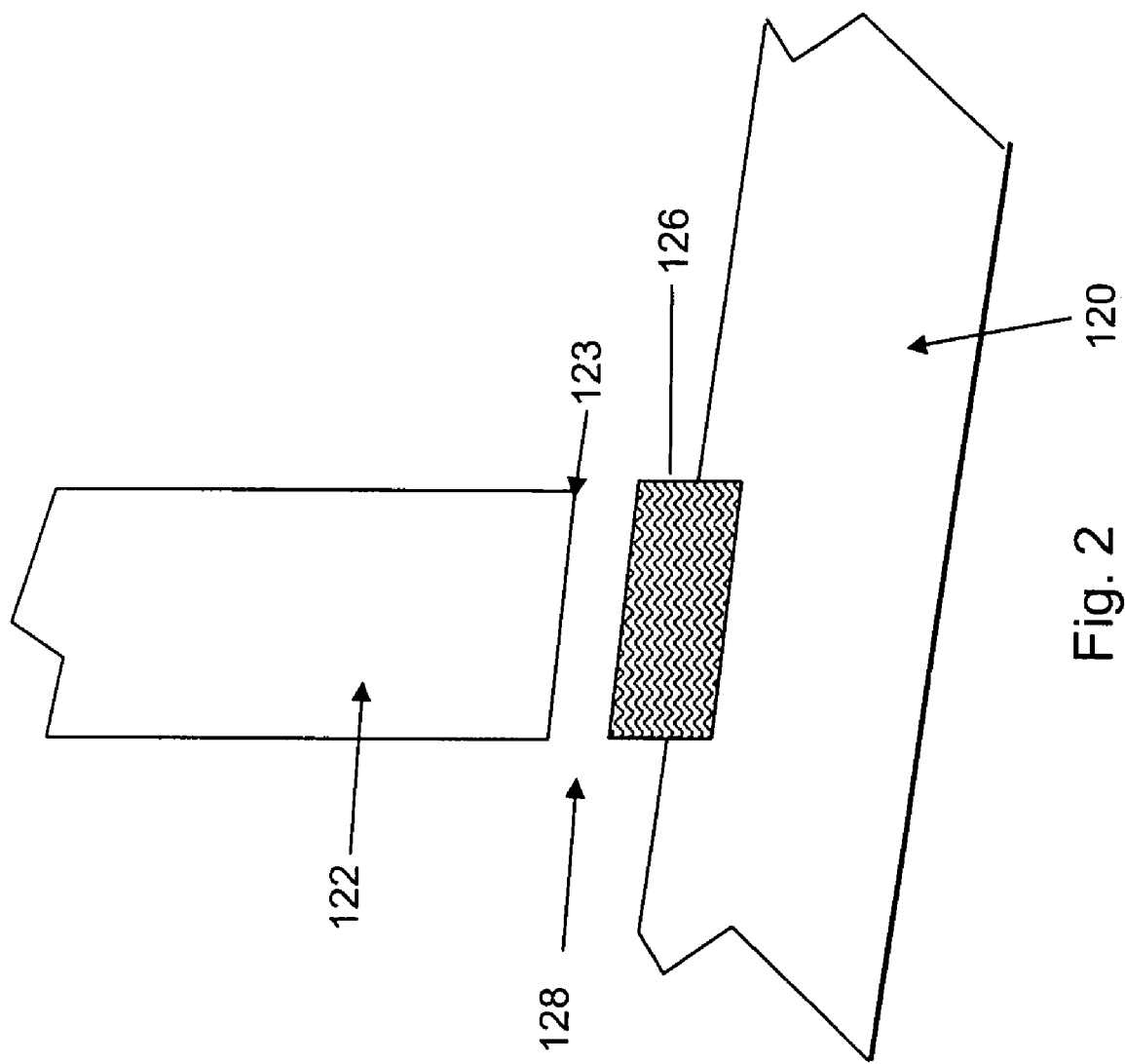
FIG. 2 is a close-up view of the turbine blade to shroud clearance according to the example embodiment of the invention.

The turbine casing 120 may include a shroud 126 affixed to the interior surface of the casing 120. The shroud 126 may be positioned proximate to the tips of the rotating turbine blades 122 to minimize air leakage past the blade tips 123. Referring to FIG. 2, The distance between the blade tip 123 and the shroud 126 is referred to as the clearance 128. It is noted that the clearances 128 of each turbine stage are not consistent due to the different thermal growth characteristics of the blades and casing.

A key contributor in the efficiency of heavy-duty gas turbines is the amount of air/exhaust gas leakage through the blade tip 123 to casing clearance 128. As mentioned above, FIG. 2 schematically illustrates the clearance 128 between the turbine blade tips 123 and the shroud 126 in the turbine casing 120. Due to the different thermal growth characteristics of the turbine blade tip 123 and turbine casing 120, clearances 128 significantly change as the turbine transitions through transients from ignition to a base-load steady state condition. A clearance control system, including its operating sequence may be implemented to address the specific clearance characteristics during all operating conditions. Incorrect design and/or sequencing of the control system may lead to excessive rubbing of the turbine blade tips 123 with the casing shrouds 126, which can result in increased clearances and reduced performance.

Figure 3:
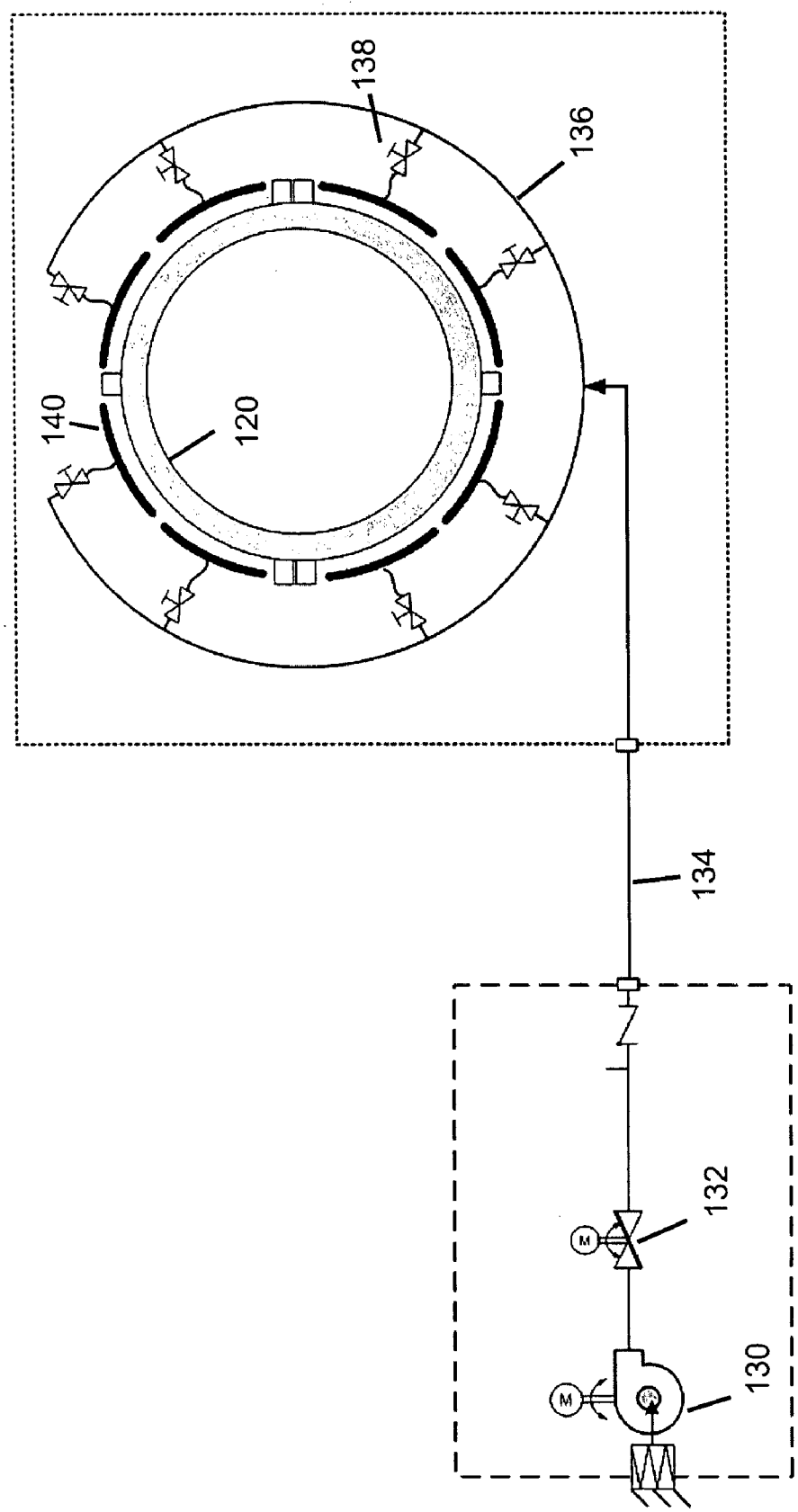
FIG. 3 is an impingement cooling system according to the embodiment of the invention.

As illustrated in the example embodiment of FIG. 3, an impingement air-cooling system may be used to reduce and maintain the clearances between the turbine shroud 126 and the accompanying blade tip 123. The impingement air-cooling system may include a blower 130, a flow control damper 132, interconnect piping 134, a distribution header 136, flow metering valves or orifices 138 and a series impingement cooling manifolds 140. In the example embodiment of FIG. 3, a plurality of impingement manifolds 140 are affixed about the circumference of the turbine casing 120. The impingement cooling blower 130 draws in ambient air and blows the air through the flow control damper 132, interconnect piping 134, distribution header 136, flow metering valves or orifices 138 and into the impingement cooling manifolds 140. The blower 130 may be any blowing device including a fan or a jet. The impingement cooling manifold 140 insures a uniform heat transfer coefficient is delivered to the turbine casing 120. It should be appreciated that the impingement air-cooling system is not limited to the components disclosed herein but may include any components that enable air to pass along the impingement cooling manifolds.

Figure 4:
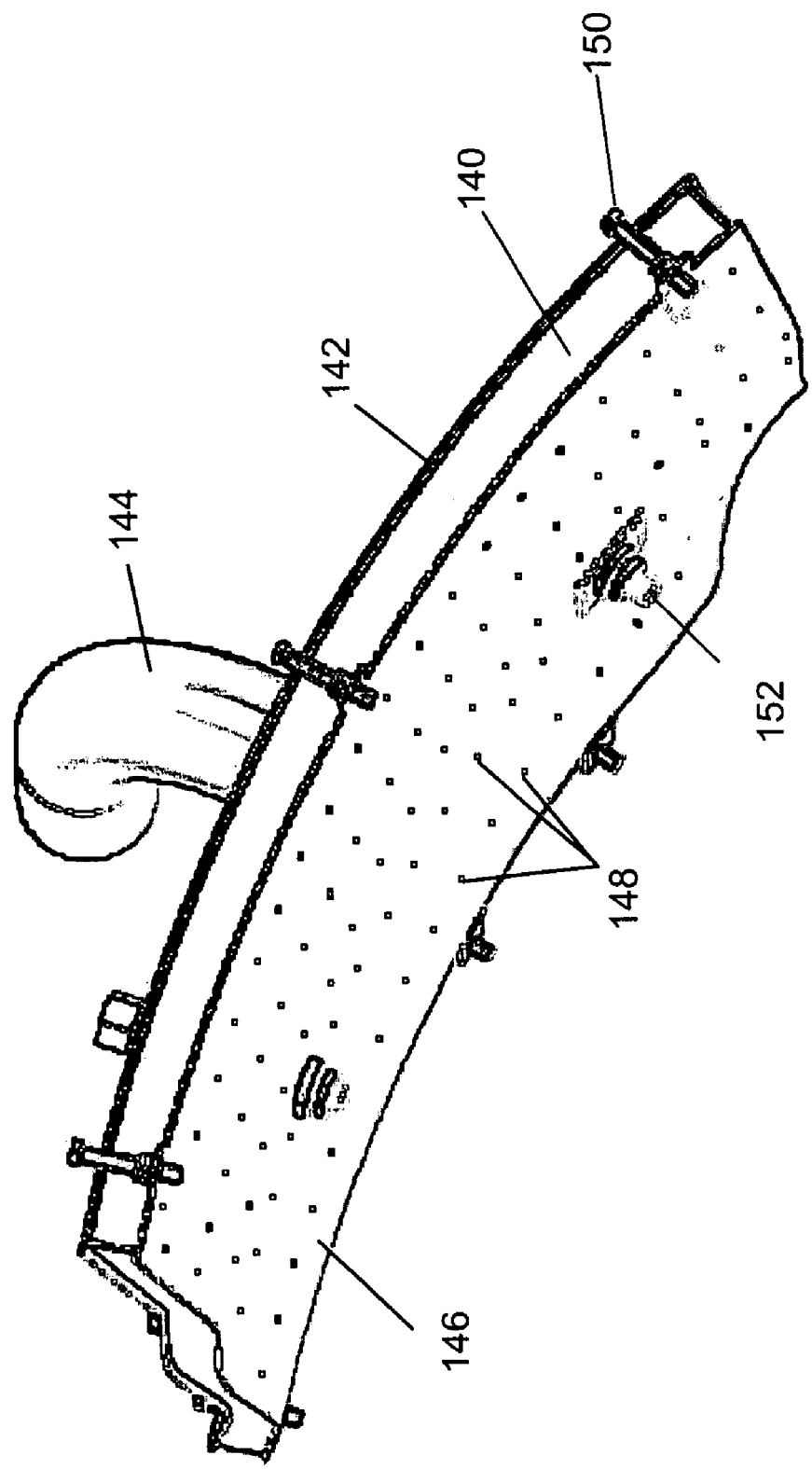
FIG. 4 is a perspective view of a impingement cooling manifold according to the example embodiment of the invention.
Figure 5:
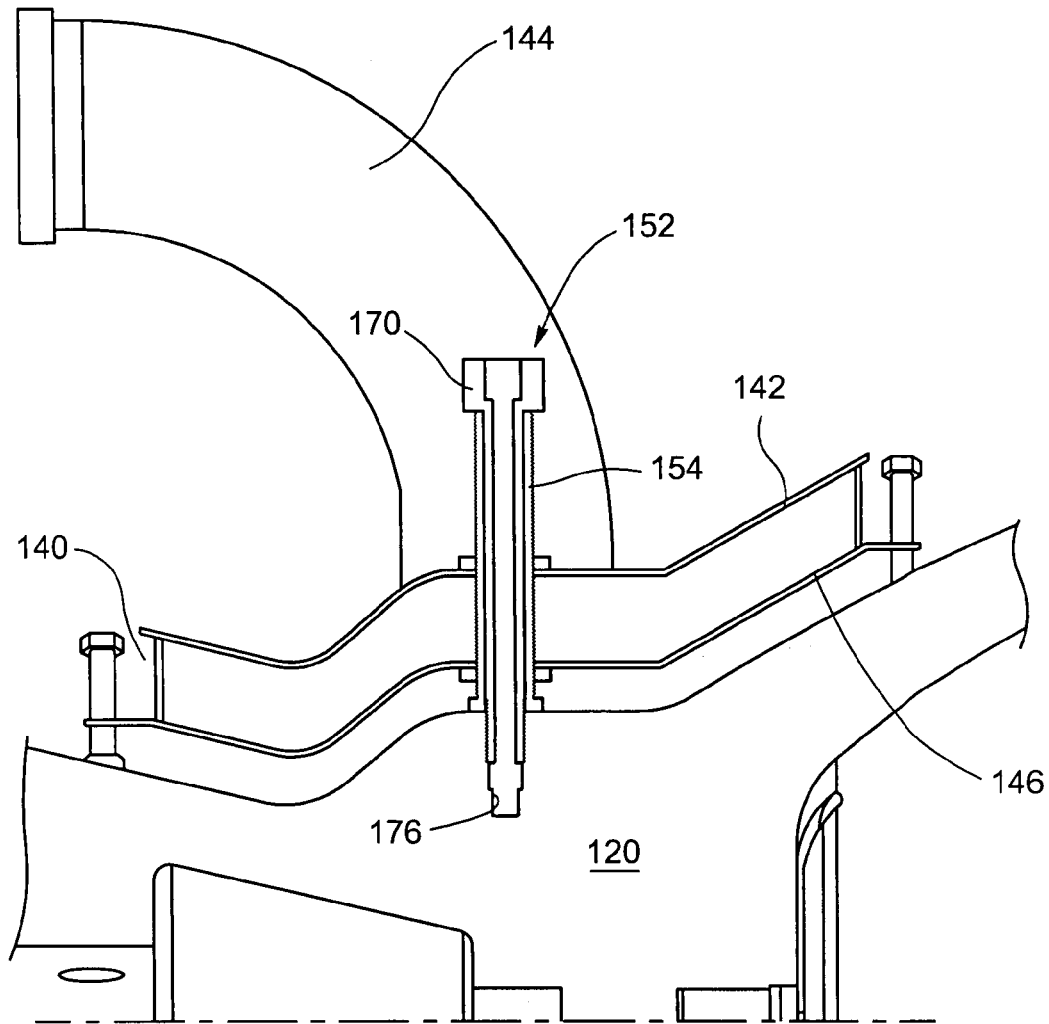
FIG. 5 is a schematic cross-section view of an impingement cooling manifold according to the example embodiment of the invention.
Figure 6:
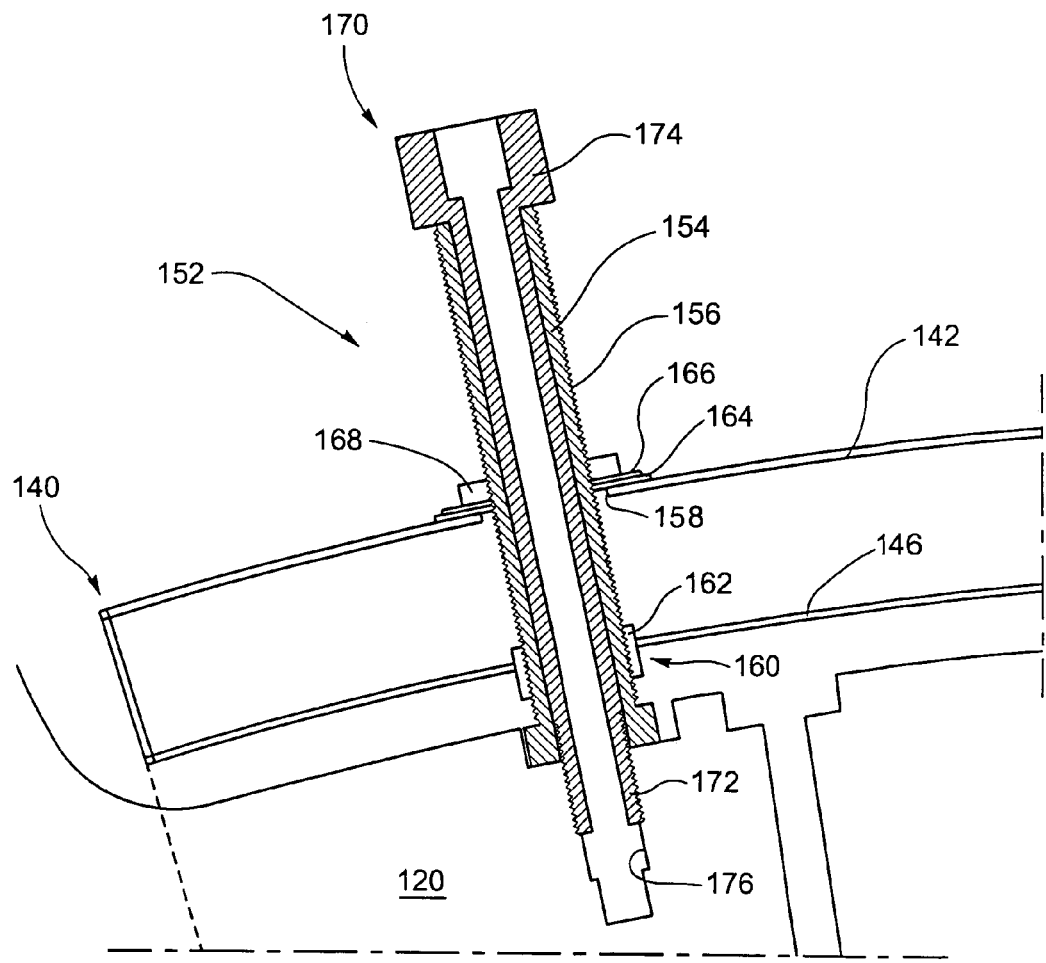
FIG. 6 is an enlarged view of the integrated support/thermocouple housing for impingement cooling manifolds of FIG. 5 as an example embodiment of the invention.

Referring to the example embodiment illustrated in FIGS. 4, 5 and 6, the impingement cooling manifolds 140 may be designed to the contours of the target area of the turbine casing 120. Each impingement cooling manifold 140 may include an upper plate 142 with feed pipe 144, a lower plate 146 with multiple impingement holes 148, side pieces, leveling legs 150 and hold-down supports 152 (described more fully below). The impingement holes 148 permit the air to flow from the impingement cooling manifold to the turbine casing to selectively cool the turbine casing.

The impingement holes 148 are positioned in an array. In an example embodiment, the impingement holes 148 may be spaced in the range from 1.25 to 2.5 inches. In an example embodiment, the individual impingement holes 148 may be sized between 0.12 and 0.2 inches. The varying hole sizes and spacing are required to compensate for the non-uniformity of the turbine casing geometry. The size and positioning of the impingement holes 148 on the lower plate 146 produces a uniform heat transfer coefficient across the casing targeted by the impingement air-cooling system. However, the impingement holes are not limited to these sizes or spacings. The distance between the upper 142 and lower plates 146 may also be dimensioned to minimize internal pressure variations, which results in uniform cooling hole pressure ratios.

The gap distance between impingement cooling manifold lower plates 146 and the turbine casing 120 affects the heat transfer coefficient. Too large of a gap can result in a non-optimum heat transfer coefficient. Too small of a gap can result in both non-optimum and a non-uniform heat transfer coefficient. In an example embodiment, a gap of between 0.5 and 1.0. inch provides a suitable heat transfer coefficient. However, the gap in not limited to this range and may be any distance that provides a suitable heat transfer coefficient.

FIG. 6 illustrates in greater detail hold down support 152, which in example embodiments of the invention both supports the manifold 140 at a predetermined distance from the surface of the turbine casing 120 and functions as a well for a casing thermocouple to monitor the temperature of the casing. The support/thermocouple housing 152 is comprised of a bushing 154 having a threaded exterior surface 156 inserted through race track holes 158,160 defined in upper plate 142 and lower plate 146, respectively.

A threaded sleeve 162 is engaged with the bushing at the interface with lower plate 146. More particularly, the threaded sleeve is welded to the lower plate and has a threaded interior surface for threadably engaging the bushing. Rotating the bushing relative to the threaded sleeve advances the bushing distal end toward the casing, until it is abutted thereagainst as shown in FIGS. 5 and 6.

To provide the desired spacing of the manifold 140 off the turbine casing, an assembly comprised of a graphite gasket 164, sheet metal washer 166 and custom nut 168 are respectively disposed about the exterior of the bushing 154. In an example embodiment, the graphite gasket 164 and the sheet metal washer 166 are each about 1/16 inch thick. The custom nut 168 threadably engages the bushing 154 to bear down on the upper plate 142.

Inserted within the bushing is a mount bolt 170. A mount bolt 170 has a threaded distal end 172 for threadably engaging a threaded counter bore 176 in the turbine casing 120 and a flange 174 at the proximal end thereof for engaging the proximal end of the bushing. The thermocouple is threaded to the proximal end of the mounting bolt and includes a thin wire (not shown) disposed through the bore of the mounting bolt and terminating in the counter bore defined in the casing. The sensor (not shown) at the end of the thermocouple wire makes contact with the casing in the counter bore, below the threaded engagement of the mounting bolt with the casing.

As illustrated, the hole 158 defined in the upper plate 142 is dimensioned to allow a limited amount of lateral play of the manifold upper plate with respect to the bushing 154 right and left while lift of the manifold with respect to the bushing is precluded by the custom nut 168. Meanwhile, the mounting bolt 170 inserted through the bore of the bushing 154 is threadably engaged with the casing 120 and has upper flange 174 for limiting displacement of the bushing away from the casing so that the mounting bolt determines the position of the bushing 154 with respect to the casing 120 and rotating the bushing 154 determines the position of the manifold 140 with respect to the casing 120.

In an example embodiment, two supports/thermocouple housings are provided for supporting the (each) manifold off the casing. As presently proposed, one of the integrated supports is engaged with a threaded sleeve as described above with reference to FIG. 6, whereas the other support is inserted through the lower plate in the absence of the threaded sleeve. Instead a slot is defined therefor in the lower plate, to allow thermal growth of the manifold. Thus, the two supports respectively provide fixed attachment and attachment with play with respect to the lower plate.

As schematically illustrated in FIG. 3, the multiple impingement cooling manifolds 140 are affixed to the casing 120 of the turbine directly above the target cooling area. The impingement cooling manifolds 140 are positioned such that there is ample spacing between their edges and any protrusions off of the casing. This provides a free path for the air passing through the impingement holes 148 to exhaust from under the impingement cooling manifold 140 to the environment. In an example embodiment, the spacing between two adjacent impingement cooling manifolds may be between 1 to 30 inches and is dependent on casing protrusions and flanged joints. The spacings are not limited to these dimensions and may be spaced at any suitable distance. The impingement cooling manifolds 140 also may provide impingement cooling to any of the axial flanges, including the horizontal split joint.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in generic and descriptive sense only and not for purposes of limitation.

Thus, the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An impingement cooling system for heavy duty turbines comprising:
   a impingement cooling manifold affixed to a casing of the heavy-duty turbine, wherein the impingement cooling manifold comprises a plurality of impingement holes in the surface of the impingement cooling manifold;
   a blower that provides air flow across the plurality of impingement holes of the impingement cooling manifold to cool the casing of the heavy-duty turbine to control a clearance between a tip of a turbine blade and a shroud of the heavy-duty turbine; and
   at least one support for supporting the impingement cooling manifold spaced from said casing, said support having a bore defined therethrough for receiving a casing thermocouple.

2. The system of claim 1, wherein said support is secured to said casing and extends through said impingement cooling manifold.

3. The system of claim 1, including a nut threadably engaged with an exterior surface of said support for limiting displacement of said manifold away from said casing.

4. The system of claim 1, wherein said support comprises a bushing extending through holes defined in said impingement cooling manifold and a mount bolt inserted through said bushing and secured to said casing.

5. The system of claim 4, wherein said mount bolt includes a threaded distal end for threadably engaging the casing and a flange at a proximal end thereof for engaging a proximal end of said bushing.

6. The system of claim 1, wherein the impingement cooling manifold comprises an upper plate and a lower plate positioned at a distance to provide substantially uniform pressure ratios across the plurality of holes.

7. The system of claim 6, wherein the plurality of impingement holes are located on the lower plate of the impingement cooling manifold.

8. The system of claim 1, wherein the plurality of impingement holes are positioned as a uniform array across the impingement cooling manifold.

9. The system of claim 1, wherein the plurality of impingement holes are positioned as a non-uniform array across the impingement cooling manifold.

10. The system of claim 1, wherein the plurality of impingement holes are uniform in diameter.

11. The system of claim 1, wherein the plurality of impingement holes are non-uniform in diameter.

12. The system of claim 1, wherein the plurality of impingement holes are a shape chosen from the group consisting of substantially round, oval, elliptical, square, triangular, and rectangular.

13. The system of claim 1, wherein the turbine blade comprises a rotary blade.

14. The system of claim 1, wherein the impingement cooling manifold comprises a plurality of impingement cooling manifolds positioned around the circumference of the casing.

15. A method of cooling a heavy duty turbine casing comprising:
   affixing at least one impingement cooling manifold comprising a plurality of impingement holes to the casing with at least one support for supporting the impingement cooling manifold spaced from said casing, said support having a bore defined therethrough for receiving a casing thermocouple; and
   blowing air into the manifold and through the impingement holes to cool the casing and to control a clearance between at least one blade tip and at least one shroud located within the casing.

16. The method of claim 15, wherein said support extends through said impingement cooling manifold and secured to said casing.

17. The method of claim 15, wherein a nut is threadably engaged with an exterior surface of said support for limiting displacement of said manifold away from said casing.

18. The method of claim 15, wherein said support comprises a bushing extending through holes defined in said impingement cooling manifold and a mount bolt inserted through said bushing and secured to said casing.

19. The method of claim 18, wherein said mount bolt includes a threaded distal end that is threadably engaging the casing and a flange at a proximal end thereof that engages a proximal end of said bushing.

20. The method of claim 15, wherein impingement cooling manifold comprises a plurality of impingement cooling manifolds positioned around the circumference of the casing.

* * * * *